United States Patent [19]
Steinich

[11] Patent Number: 6,154,975
[45] Date of Patent: Dec. 5, 2000

[54] MEASURING CABLE TRAVEL SENSOR FOR SENSING TRAVEL OF A MOVEABLE BODY UNDER DIFFERENTIAL PRESSURE CONDITIONS

[75] Inventor: Klaus-Manfred Steinich, Poering, Germany

[73] Assignee: ASM Automation Sensorik Messtechnik GmbH, Unterhaching, Germany

[21] Appl. No.: 09/099,937

[22] Filed: Jun. 19, 1998

[30] Foreign Application Priority Data

Jun. 19, 1997 [DE] Germany .......................... 197 26 084

[51] Int. Cl.[7] ...................................................... G01B 3/10
[52] U.S. Cl. ................... 33/756; 33/755; 33/762; 33/763
[58] Field of Search ............... 33/755, 756, 762, 33/763

[56] References Cited

U.S. PATENT DOCUMENTS 3,780,440 12/1973 Taylor ......................................... 33/139
5,761,822 6/1998 Steinich ...................................... 33/756

FOREIGN PATENT DOCUMENTS

| 29 47 372 A1 | 5/1981 | Germany . |
| 42 17 607 A1 | 2/1994 | Germany . |
| 195 20 388 A1 | 12/1996 | Germany . |

*Primary Examiner*—Diego Gutierrez
*Assistant Examiner*—Yaritza Guadalupe
*Attorney, Agent, or Firm*—Evenson, McKeown, Edwards & Lenahan, P.L.L.C.

[57] ABSTRACT

A measuring cable travel sensor for detecting the position of a movable body and operable under differential pressure comprises a cable drum for winding on and off a measuring cable, a spring for prestressing the cable drum to wind on the measuring cable and a rotary position sensor for detecting the position of the cable drum. The sensor has a differential pressure chamber which is under the differential pressure and in which a cable eye for connection of the cable to the movable body is arranged, a cable chamber in which the cable drum is arranged and a spring chamber in which the spring is arranged. The differential pressure chamber communicates at least with the cable chamber and the spring chamber.

24 Claims, 4 Drawing Sheets

MEASURING CABLE TRAVEL SENSOR FOR SENSING TRAVEL OF A MOVEABLE BODY UNDER DIFFERENTIAL PRESSURE CONDITIONS

FIELD OF THE INVENTION

The invention concerns a measuring cable travel sensor and more particularly a measuring cable travel sensor which is suitable for use under conditions involving a differential pressure.

BACKGROUND OF THE INVENTION

Measuring cable travel sensors are typically used in a very wide range of different situations in order to be able to precisely ascertain he instantaneous position of a remote body or component at any time. The remote body or component which is variable in respect of its position may be for example the rudder of a tailplane assembly on an aircraft or for example the cabin of an elevator.

For that purpose a typical form of measuring cable travel sensor comprises a measuring cable which is wound onto a cable drum and to the free end of which the movable body whose position is to be detected and monitored is secured, for example by being secured to a cable eye at the free end of the cable. The measuring cable travel sensor is disposed at a stationary position for monitoring the movement of the movable body with respect there to.

The above-mentioned cable drum is so pre-stressed for example by means of a spring that the measuring cable is always wound onto the cable drum as far as possible. The position of the remote movable body is ascertained by any rotary movement or part of a rotary movement of the cable drum being detected by means of a rotary position sensor whereby the instantaneous position of the movable body whose position is to be monitored can be known at any time by cumulation of the signals from the rotary position sensor.

So that the position of the movable body can be determined with a very high degree of accuracy, the measuring cable which is wound on the cable drum is a cable or wire that is as thin as possible, and it is wound on the cable drum in a defined manner, in particular in the form of only a single winding or layer of turns on the periphery of the cable drum as, if the cable were to start to wind over the top of the winding on the periphery of the drum, in such a way as to form a second layer of turns thereover, that would increase the circumference of the cable winding on the drum and that would therefore falsify the measurement result. For that purpose the diameters of the cable drums are selected to be as large as possible in relation to the diameter of the measuring cable.

For the same reason evaluation of the rotational movements of the cable drum, which is generally effected by opto-electronic or electrical means, must be kept as free as possible of any influences which could cause falsification of the measurement result, that is to say on the one hand any kind of fouling or contamination, and in particular moisture, and on the other hand electromagnetic radiation, which therefore already requires a considerable level of expenditure to obviate such adverse effects.

In addition there are also situations of use of measuring cable travel sensors, in which the movable body whose position is to be monitored by the sensor is not operating under normal pressure, but under a differential pressure, generally a relatively high overpressure. In that situation it is often not possible for the cable eye of the measuring cable, by means of which the measuring cable is secured to the moving body, to be arranged on the moving body in such a way that the fixing point established by the cable eye can be adequately sealed relative to the differential pressure environment in which the moving body whose position is to be determined by the sensor is disposed.

That accordingly involves a requirement to provide a measuring cable travel sensor which is also capable of operating under conditions involving a differential pressure and in particular an overpressure. In that respect in particular it must be possible to arrange the cable eye of the measuring cable in a space which is under such a differential pressure, that is to say generally an overpressure.

In such a situation, without additional measures being taken, the fact that the cable guide bush through which the measuring cable passes into the housing of the measuring cable travel sensor is not pressure-tight would mean that the overpressure which obtains in the region of the cable eye would therefore also prevail in the interior of the housing of the measuring cable travel sensor and there initially in the region of the cable drum which is to wind on the measuring cable.

In measuring cable travel sensors of that kind however the spring for prestressing the cable drum is generally arranged in axially displaced relationship with respect thereto, and the cable drum and the spring are non-rotatably connected to each other by way of a shaft. The rotary position sensor for sensing the rotary position of the cable drum is additionally arranged on that shaft, at the side of the spring.

That design configuration provides an axial succession from the cable drum by way of the spring to the rotary position sensor and the electronic evaluation system to which the rotary position sensor is connected, and that is specifically adopted so that the fouling or contamination which inevitably occurs at the cable drum, due to the measuring cable being movable between positions in which it is first outside and then inside the housing of the measuring cable travel sensor, can also reach the spring and the rotary position sensor to an ever decreasing degree.

For that purpose the typical design configuration of such a measuring cable travel sensor also includes axial sealing means for sealing the cable chamber in which the cable drum is disposed, with respect to the axially adjoining spring chamber which accommodates the spring and the sensor chamber which accommodates the rotary position sensor. In that respect a particularly important consideration is to provide for axial sealing integrity at the location at which relative movement occurs, that is to say where the central shaft connecting the cable drum and the spring is passed through structure such as a housing wall. Known shaft sealing rings, radial lip seals, O-rings or the like are generally used for that purpose, depending on the respective situation of use involved.

If however shaft seals of that kind are under an overpressure at one side, which would be the case in the event of a differential pressure obtaining in the cable chamber accommodating the cable drum, then such seals apply to the shaft a generally greatly increased radial force which is very greatly different from the normal condition.

In a typical prior measuring cable travel sensor however that would mean that the measuring cable would not wind onto the cable drum, under the effect of the prestressing force, in the correct manner, for example not in the correct timed relationship, but in a slightly time-displaced fashion, and that is unacceptable for the situations of use involved which are generally highly critical in terms of position. In particular that situation could result in the cable jumping over the winding on the cable drum, that is to say it could result in a second winding being formed over the top of a first layer of turns on the drum, with the structure of the second layer of turns being undefined and therefore catastrophic in terms of the accuracy of the measurement result.

Furthermore the cable chamber accommodating the cable drum on the one hand and the sensor chamber accommodating the rotary position sensor on the other hand cannot simply be completely open relative to each other as otherwise the fouling and contamination which generally occurs at the cable drum would also occur equally at the rotary position sensor and would thus have a long-term adverse effect on the measurement result thereof.

It will be appreciated at this point that the most obvious option in this respect is for the location at which the cable passes into the housing of the measuring cable travel sensor, for example by passing through a wall thereof, to be of such a design as to afford sealing integrity, for example by means of a plurality of successively connected labyrinth seals, or the like. However, because of the sliding friction which would occur at such an arrangement and the wear that this would entail that is not a solution which in the long term gives satisfactory results, in particular also for the reason that the measuring cable used is generally a braided steel cable whose outside peripheral surface is accordingly not smooth but is of a somewhat corrugated configuration by virtue of the braiding structure.

Furthermore an important requirement on the part of the user is that it must be possible to carry out maintenance and repair operations in particular on the rotary position sensor and the electronic evaluation system connected thereto without having to remove the differential pressure in the region of the cable eye at which the movable body is connected to the measuring cable.

SUMMARY OF THE INVENTION

An object of the present invention is to provide a measuring cable travel sensor which in consideration of the boundary conditions involved nonetheless on the one hand has a long service life while on the other hand preventing any kind of fouling or contamination from gaining access to the sensor unit and also being of a simple and inexpensive construction.

Another object of the present invention is to provide a measuring cable travel sensor for use under differential pressure conditions, which affords accurate and reliable measuring results while being of a simple design configuration.

In accordance with the principles of the present invention the foregoing and other objects are achieved by a measuring cable travel sensor for sensing the travel of a body, for use under differential pressure conditions, comprising a cable drum for winding on the measuring cable, a spring for prestressing the cable drum to wind the measuring cable onto same, and a rotary position sensor for sensing the rotary position of the cable drum. A differential pressure space or chamber which in use is under differential pressure and in which a cable eye for connecting the measuring cable to said movable body is arranged is communicated at least with a cable space or chamber in which the cable drum is arranged and a spring space or chamber in which the prestressing spring is arranged.

As will be apparent from the detailed description hereinafter of a preferred embodiment of the measuring cable travel sensor according to the invention, the fact that the differential pressure chamber in which the cable eye is thus disposed is in communication, for example for way of a cable bushing through which the measuring cable passes, at least with the cable chamber accommodating the cable drum and the spring chamber accommodating the prestressing spring means that substantially the same pressure obtains in the cable chamber and the spring chamber as in the differential pressure chamber, and as a result a shaft seal which is operatively disposed between the cable chamber and the spring chamber and which is required to prevent fouling or contamination from passing between the two along a shaft extending therebetween is not loaded at one side and thereby does not apply an undesirably high level of force radially inwardly against the periphery of the shaft extending between the cable chamber and the spring chamber.

In that respect, a distinction is to be made as to whether the rotary position sensor which is particularly sensitive in its reaction to contamination or soiling is arranged together with the prestressing spring in a chamber or space which is not separately sealed off with respect to the spring chamber, as is usual in the case of conventional measuring cable travel sensors, or in a chamber or space which is further separated in relation thereto.

In the former conventional case the occurrence of fouling or contamination at the rotary position sensor is substantially prevented by the sensor chamber in which the rotary position sensor is accommodated and which in terms of pressure form a unit with the spring chamber being supplied with the differential pressure, with the cable chamber merely by way of a by-pass. In that way it is possible for the by-pass to be taken by way of a filter, in order thereby to avoid contamination and impurities at the sensor.

In order to be able to carry out maintenance and repair operations in particular on the sensor, the sensor chamber is easily accessible after the removal of a cover or a cap.

As the above-mentioned filter which is disposed in the by-pass can become clogged with time and thus in turn pressure equalisation on the two sides of the shaft seal would be effectively prevented, the filter must also be easily replaceable. In that respect it is preferably disposed at the sensor end of a conduit or duct forming the by-pass and it can also be easily changed upon removal of the cap of the sensor.

So that an overpressure cannot escape when the sensor side of the measuring cable travel sensor is opened, from the differential pressure chamber, that is to say the region of the cable eye at which the cable is connected to the movable body whose position is to be sensed, a shut-off valve can additionally be provided in the by-pass. The valve can be for example in the form of a valve screw which extends transversely into the by-pass and which in turn must be sealed off with respect to the ambient atmosphere.

In that way it is possible, prior to opening of the sensor side of the measuring cable travel sensor, to bring the sensor chamber to ambient pressure prior to its being opened, by virtue of a procedure involving closing the shut-off valve and allowing the overpressure to escape from the sensor chamber, which is preferably effected through a separate venting screw.

Another option in this respect provides for disposing the rotary position sensor separately from the spring chamber. In that case however, with a conventional design configuration, that is to say with a central shaft extending as far as the sensor, the same problem again occurs as in the situation involving supporting and sealing off the shaft between the cable chamber and the spring chamber, insofar as the shaft seal provided there at the shaft-supporting means may not be subjected to an axial pressure loading at one side.

The way to overcome such difficulties in this alternative configuration is therefore that of completely eliminating a mechanical connection, for example a shaft, between the cable chamber and the spring chamber on the one hand and the sensor chamber on the other hand. Making the connection in a non-mechanical fashion, that is to say for example by magnetic means or by means of electrical induction, makes it possible to adopt a closed wall structure between the two chambers, which acts in an optimum pressure-tight fashion and which affords sealing integrity in relation to contamination or fouling.

In such an arrangement one half of the non-mechanical connecting assembly, for example a magnetic coupling arrangement, is usually disposed on the side of the spring chamber and the cable chamber, that is to say in the region which is subjected to the effect of differential pressure, while the other half of the connecting assembly, for example of the magnetic coupling arrangement, is disposed on the normal pressure side, that is to say outside the differential pressure housing.

On that other side the sensor is in turn operatively connected to that other half of the for example magnetic coupling arrangement and the two parts can either be disposed jointly or only the magnetic coupling arrangement can be disposed in a separate additional housing which however preferably represents compartmentalisation with respect to the ambient atmosphere, that is not pressure-tight but only involves sealing integrity in relation to contamination or fouling.

Irrespective of which of the alternative structures according to the invention as outlined above is adopted, it will be appreciated that the part of the travel sensor housing, which is subjected to the differential pressure must be pressure-tightly sealed off relative to the normal pressure environment by means of seals such as conventional O-rings and the like and the individual parts of the differential pressure housing must also be sealed off relative to each other.

The supporting arrangement and/or the sealing arrangement for the central shaft can be arranged as previously usual only between the cable chamber and the spring chamber while only one supporting arrangement without a sealing arrangement is provided on the other side of the cable chamber. Likewise it is also possible for a shaft sealing arrangement to be additionally disposed there.

O-rings are frequently used as the seals when employing plain bearings while when rolling bearings are used, radial shaft sealing rings or lip seals which also seal in an axial direction are used, or rolling bearings which are directly sealed and which have in the bearing itself a suitable single-sided or double-sided axial seal which affords sealing integrity up to specified pressure values.

In that respect the differential pressure chamber includes either only the region in which the cable eye is disposed and it is sealed off with respect to the cable bushing which represents the point at which the cable passes into the actual housing of the measuring cable travel sensor, and with respect to the ambient atmosphere.

However, beyond the region of the cable eye, the differential pressure chamber may also include a part of the space around the housing of the measuring cable travel sensor, which in an individual case can have the result that it is possible to forego specific seals for the housing of the measuring cable travel sensor with respect to the ambient atmosphere, which then in fact involves the same differential pressure.

It should be ensured however that the cover means for the sensor is disposed entirely outside the region of the differential pressure.

Further objects, features and advantages of a sensor in accordance with the present invention will be apparent from the following description of a preferred embodiment thereof.

DESCRIPTION OF THE PREFERRED EMBODIMENT

Figure 1:
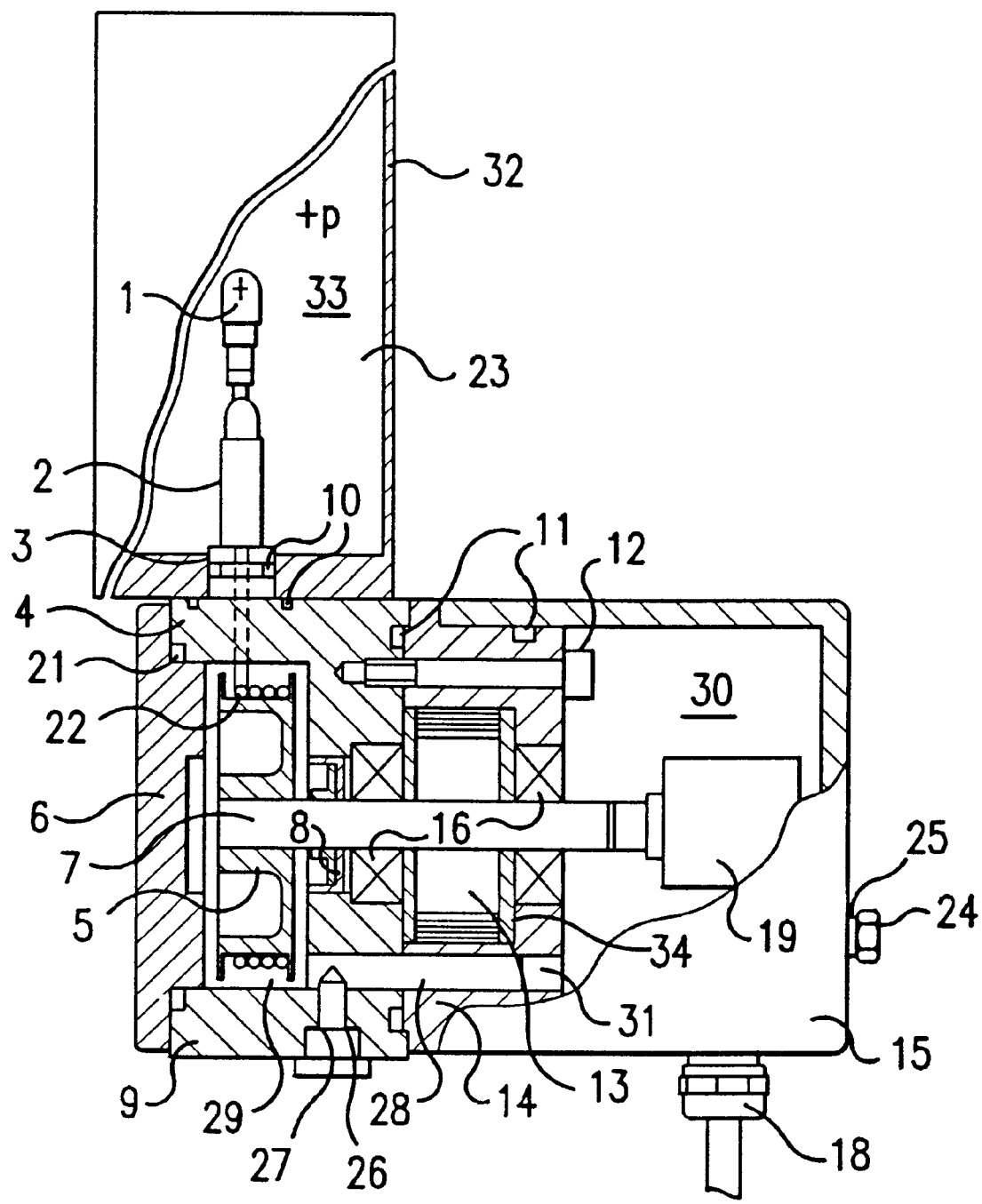
FIG. 1 is a view in longitudinal section of a measuring cable travel sensor.

Referring firstly to FIG. 1 reference numeral 1 therein denotes a cable eye at which a measuring cable 22 of a measuring cable travel sensor for use under differential pressure conditions is suitably connected to a movable body whose position or travel is to be sensed. The cable eye is arranged outside the housing of the actual measuring cable travel sensor and bears by way of a rubber stopper member 2 against a cable bushing 3 in the condition of the measuring cable 22 in which it is fully wound onto a cable drum as indicated at 5. It will be seen that the measuring cable 22 passes movably through the cable bushing 3. It will be seen that the cable eye 1 is within a pressure housing 32 in which there is a differential pressure, generally an overpressure as indicated by +p, and thus at least the fixing point for the movable body M whose position and travel are to be monitored as formed by the cable eye 1 is in the location where the differential pressure obtains.

The illustration of the pressure housing 32 in relation to bearing only against the cable bushing 3 can be realistic or also only a symbolic illustration insofar as the pressure housing 32 also extends over other parts of the housing, for example over the end of the housing of the measuring cable travel sensor on the side of the cable drum 5 and so forth.

The basic structure of the housing shown in FIGS. 1 through 4 corresponds to known design configurations, as described hereinafter with reference to the view in longitudinal section in FIG. 1.

The cable drum 5 onto which and from which the measuring cable 22 is wound under the effect of movement of the movable body whose position and travel are to be sensed is disposed in a drum housing 9 which in the illustrated embodiment is tubular and which is of a rotationally symmetrical configuration, at least at the inner periphery and possibly also at the outer periphery. The sensor has a central shaft 7 which extends through a through opening in the drum housing 9 and is supported in the drum housing 9 and sealed in the axial direction by means of a radial shaft seal 8 such as a lip seal.

The drum housing 9 is closed by means of a cable cover indicated at 6 on the side of the cable drum 5.

On the opposite end a spring housing 14 is screwed onto the drum housing 9. The spring housing 14 is also of a rotationally symmetrical configuration at least in regard to its inner periphery and preferably also at its outer periphery. The spring housing 14 is also sealed off with respect to the drum housing 9 by means of an O-ring 11 at its end.

The spring housing 14 accommodates a prestressing spring 13 illustrated in the form of a spiral spring which is non-rotatably connected by its one end to the central shaft 7 and which is fixed by its other end in the spring housing 14 and which thus continuously subjects the cable drum 5 to a spring loading urging it in the direction of winding the measuring cable 22 onto the cable drum 5.

The spring 13 generally has contact discs at its sides to reduce friction between the spring and the surrounding components.

The shaft 7 is supported at a second location in the spring housing 14.

The spring housing 14 is screwed onto the drum housing 9 by means of axially directed screws or bolts as indicated at 12.

The shaft 7 extends beyond the free end face of the spring housing 14, which is at the right in FIG. 1, and a rotary position sensor 19 for sensing the rotary position of the cable drum 5 is fixed on the end portion of the shaft 7 which projects freely beyond the end face of the spring housing 14. The region of the sensor 19 is covered over by means of a cowl or cap 15 which is fitted onto the spring housing 14 and screwed thereto and sealed with respect thereto by means of an 0-ring 11.

That means that the interior of the housing comprises the cable chamber 29 in which the cable drum 5 is disposed, the spring chamber 34 in which the spring 13 is disposed and the sensor chamber 30 in which the rotary position sensor 19 is disposed.

In that arrangement the cable chamber 29, as the chamber which suffers from fouling and contamination to the greatest extent, is also sealed off in relation to fouling or contamination material by means of seals at the shaft 7, with respect to the adjoining spring chamber 34.

The structure shown in FIG. 1 involves in that respect a shaft seal or lip seal 8, while the supporting arrangements for the shaft 7 comprise ball bearing assemblies 16.

The structure shown in FIG. 1 provides in accordance with the invention that the seal in the form of the shaft sealing ring 8 is not to be loaded at one side by means of the overpressure involved, and therefore an eccentric by-pass 28 in the form of a suitable duct or conduit such as an axial bore leads from the cable chamber 29 to the sensor chamber 30. Accordingly, the same pressure conditions obtain at both sides at the shaft sealing ring 8, by virtue of the ball bearing assemblies 16 not being pressure-tight.

A by-pass from the sensor chamber 30 directly into the next adjacent end of the spring chamber 34 would already have been sufficient for that purpose.

By virtue of the by-pass 28 extending past the spring chamber 34 into the sensor chamber 30 in FIG. 1 however the FIG. 1 arrangement provides that it is possible to dispose at the sensor end of the by-pass 28 a filter diagrammatically indicated at 31 for retaining impurities, which thus is readily accessible just as easily as the sensor 19, after removal of the cap 15, for maintenance and repair purposes.

As, by virtue of the provision of the by-pass 28, the sensor chamber 30 is under the same overpressure +p as the differential pressure space or chamber 33, as in fact the cable bushing 3 is capable of transmitting pressure therethrough, the by-pass 28 must be closed prior to the removal of the cap 15 as otherwise the result would be a loss of pressure in the differential pressure chamber 33, and that is generally undesirable.

For that purpose, arranged transversely to the line of passage of the by-pass 28 is a shut-off valve 27 in the form of a closure screw, which is in turn sealed off with respect to the housing accommodating it, by means of a seal as indicated at 26.

In addition a venting screw 24 which is also provided with a seal 25 is arranged in the cap 15.

By virtue of that structure, after closure of the shut-off valve 24, it is possible firstly for the overpressure to be let out of the sensor chamber 30 by opening the venting screw 24 and then to remove the cap 15 which also carries the cable bushing 18 for connecting the sensor to external processing units.

Figure 2:
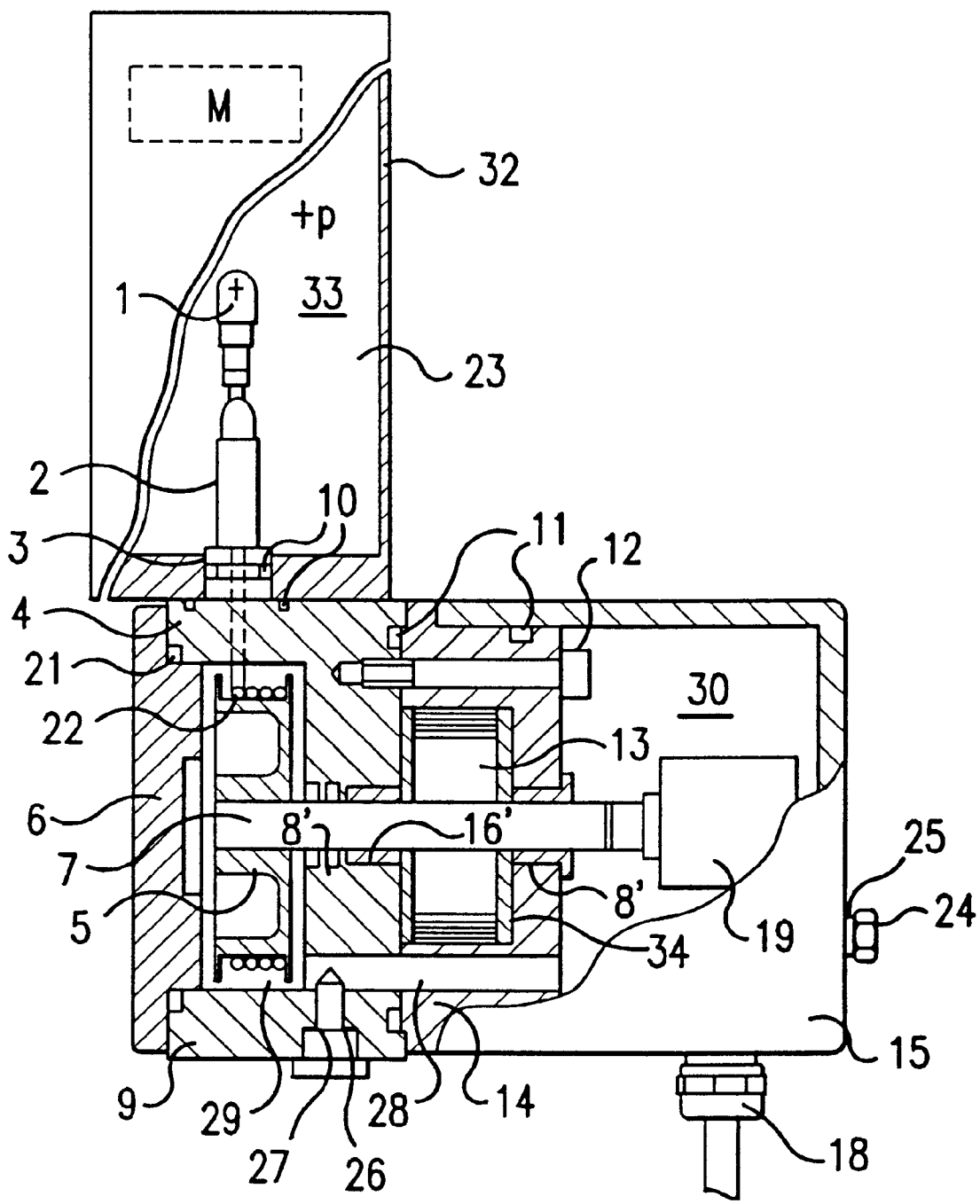
FIG. 2 is a similar view to FIG. 1 showing a different shaft supporting arrangement and sealing arrangement in comparison with FIG. 1.

Reference will be made to FIG. 2 showing a structure which differs from that illustrated in FIG. 1 in that the shaft 7 is mounted by means of plain bearings in the drum housing 9 and in the cable housing 14, with two O-rings 8' being used in succession as an axial seal to prevent the penetration of contamination and fouling at the supporting arrangement in the drum housing 9.

Figure 3:
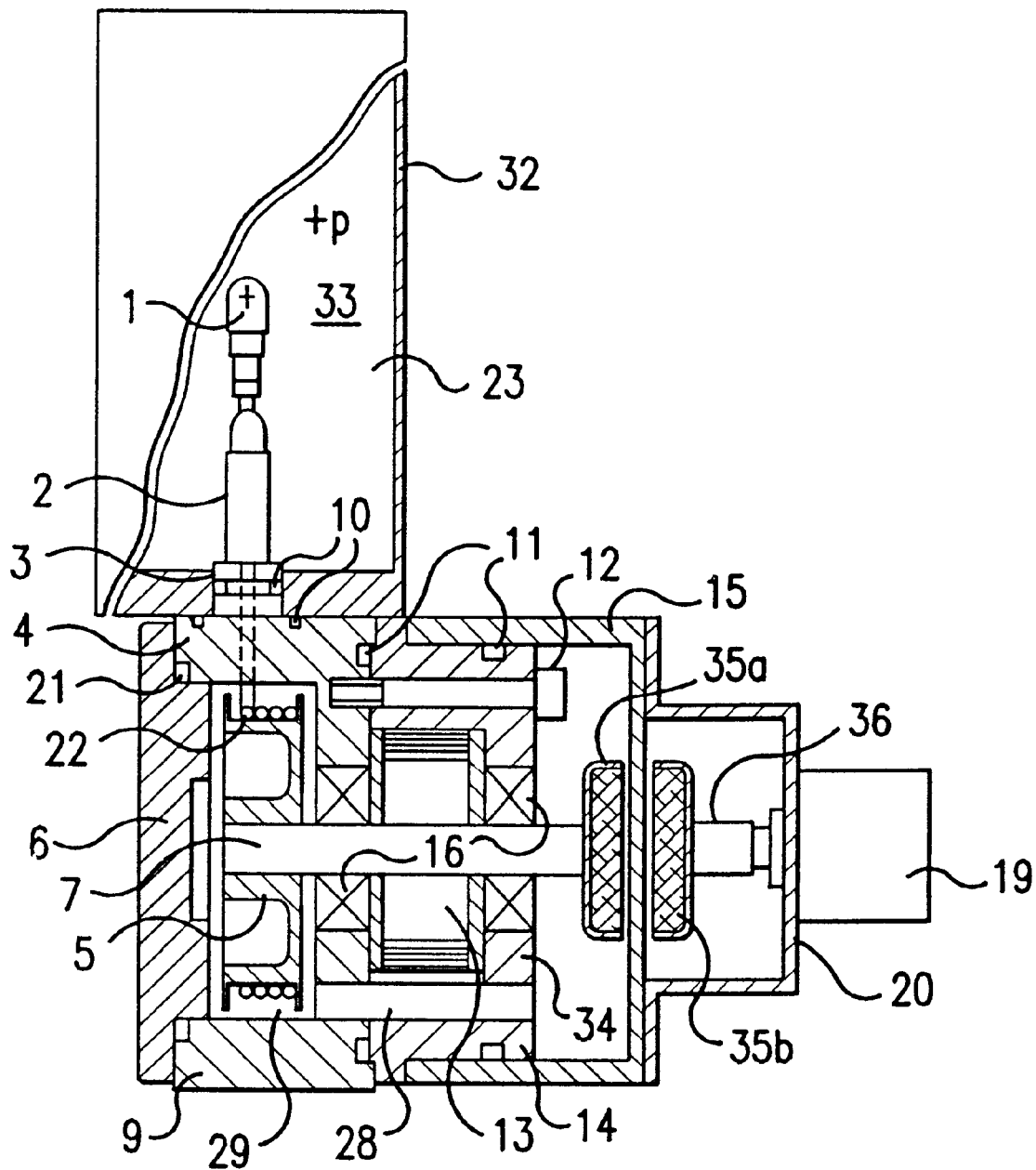
FIG. 3 is a view in longitudinal section with a sensor which is arranged in mechanically separated fashion.
Figure 4:
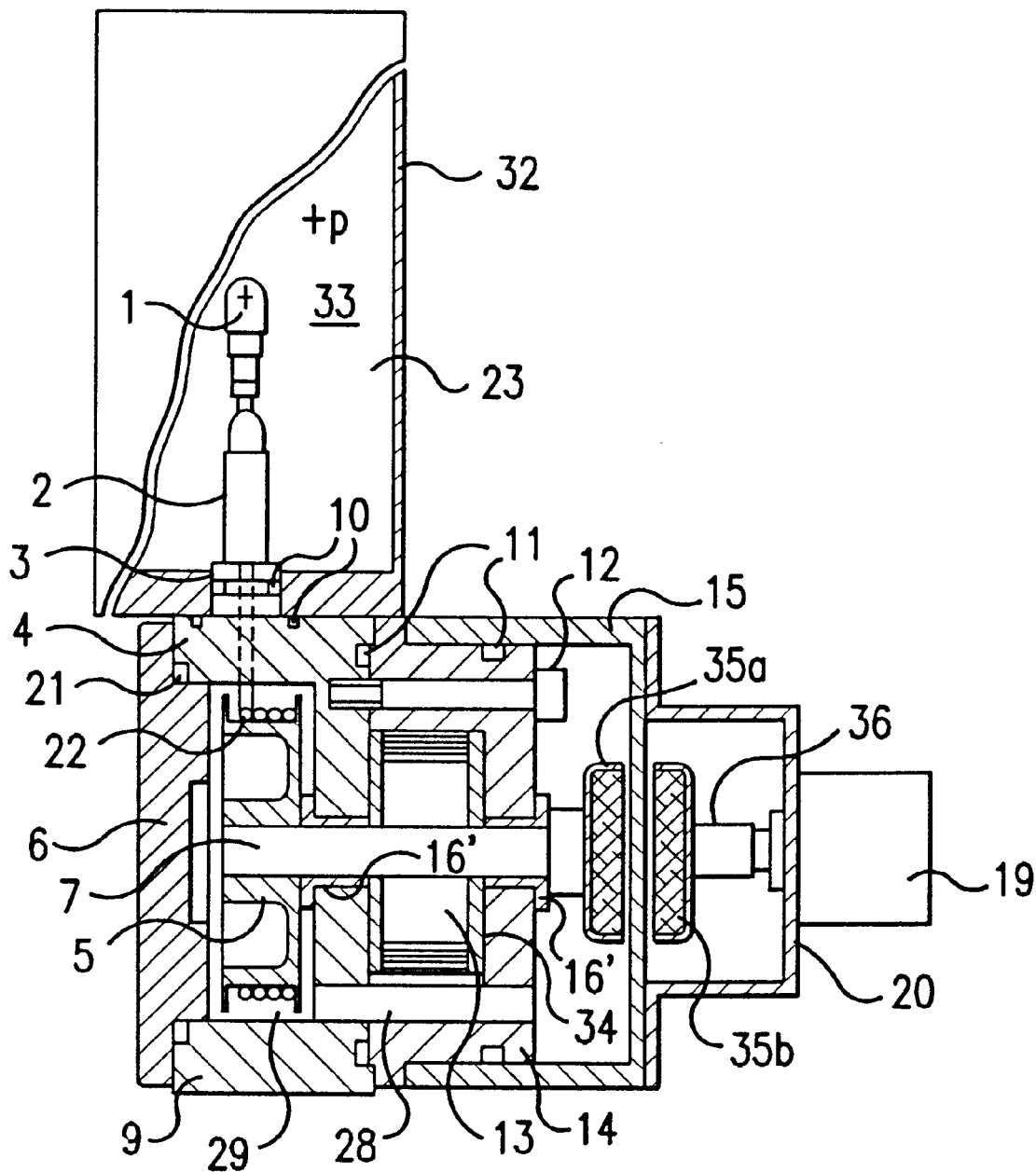
FIG. 4 shows a structure similar to the illustration in FIG. 3.

With reference now to FIGS. 3 and 4, the structures illustrated therein differ from the structures of FIGS. 1 and 2 in that the shaft 7 does not extend from the cable drum 5 to the sensor 19.

In that respect, the region in which differential pressure obtains, besides the differential pressure chamber 33 itself, only embraces the cable chamber 29 and the spring chamber 34, and the cap 15 which is fitted is onto the spring housing 14 by means of the screws 12 forms, on the end of the spring housing 14 remote from the cable drum 5, with the spring housing 14, a free space in which the shaft 7 terminates, with an end portion thereof projecting beyond the spring housing 14. One half 35a of a magnetic coupling arrangement is arranged on the end portion of the shaft 7 which projects beyond the spring housing 14, as closely as possible to the end portion of the cap 15.

The half 35a of the magnetic coupling arrangement, being in the form of a disc, is disposed in confronting relationship with a second half 35b of the same configuration, outside the end wall portion of the cap 15. The two halves 35a and 35b of the magnetic coupling arrangement constituted thereby are of such polarities that a rotary movement of the one half 35a which is produced by rotation of the cable drum 5 produces a rotary movement to the same extent of the other half 35b which is disposed outside the cap 15. The smaller the subdivision of the magnetic coupling arrangement into individual segments the finer is the detection of rotational movements, that is possible by means of the magnetic coupling arrangement.

The half 35b which is disposed outside the cap 15 is arranged non-rotatably on a sensor shaft 36 at the end thereof. The sensor shaft 36 goes to the rotary position sensor 19. The sensor shaft 36 is supported in an additional cowl or cap 20 which can be suitably fixed on the end face of the cap 15. The cap 20 serves to keep away fouling or contamination from the ambient area, in relation to the outer half 35b of the magnetic coupling arrangement, but it does not seal off the outer half 35b in relation to the pressure of the ambient atmosphere.

The rotary position sensor can also be arranged within the additional cap 20.

In the structure shown in FIG. 3 the shaft 7 is supported in the differential pressure region by way of rolling bearing assemblies 16, more specifically on the one hand in the drum housing 9 and on the other hand in the spring housing 14.

If in that respect sealed rolling bearing assemblies are used instead of employing separate sealing arrangements, such seals which are incorporated into the rolling bearing assemblies tend to impede the rotational movement of the shaft when the bearings are subjected to a considerable pressure loading on one side, so that in this case also the arrangement is to include a by-pass 28 to provide a suitable connection between the cable chamber 29 and the chamber or space in which the magnetic coupling arrangement 35a, 35b is disposed.

The fact that the right-hand rolling bearing assembly 16 in FIG. 3 is preferably not a sealed bearing assembly means that the same pressure also obtains in the region of the spring 13.

As neither the spring 13 nor the magnetic coupling arrangement 35 react as sensitively to fouling or contamination as the sensor 19, it is also possible for the by-pass 28 to manage without the provision of a filter, depending on the ambient influences occurring at the cable bushing 3.

As generally only the sensor 19 has to be accessible for maintenance and repair purposes, the construction shown in FIG. 3 also does not require either a shut-off valve or a venting screw in relation to the spring chamber 34.

FIG. 4 shows a structure as illustrated in FIG. 3, but in which the shaft 7 is supported in the drum housing 9 and the spring housing 14 by means of plain bearings 16'.

The plain bearing 16' provide an adequate sealing effect in relation to contamination or fouling but at the same time they are also too pressure-tight in order solely by way of such plain bearings to ensure rapid pressure equalisation as between the cable chamber and the spring chamber 34.

In this case also, because of the axial flange configuration of plain bearings of that kind, an undesirable loading on the shaft 7 occurs if the bearing assembly is subjected to a pressure loading at one side, and that can again be avoided by the provision of a by-pass 28 as was described hereinbefore for example with reference to FIG. 3.

It will be appreciated that the above-described structures in accordance with the principles of the present invention have been set forth merely by way of example and illustration thereof and that various other modifications and alterations may be made therein without thereby departing from the spirit and scope of the present invention.

What is claimed is:

1. A measuring cable travel sensor for sensing the travel of a movable body, for use under differential pressure conditions, comprising a measuring cable, a connecting means on the measuring cable for connection thereof to said body, a cable chamber, disposed in said cable chamber a cable drum for winding on the measuring cable, a spring chamber, disposed in the spring chamber a spring for prestressing the cable drum for winding on the measuring cable, a rotary position sensor for sensing the rotary position of the cable drum, a differential pressure chamber which in, use is under, differential pressure and in which the cable connecting means is arranged, and means communicating the pressure of the differential pressure chamber at least with the cable chamber and with the spring chamber.

2. A sensor as set forth in claim 1 including a housing which includes at least the cable chamber and the spring chamber containing the spring, wherein the housing together with the differential pressure chamber is sealed off relative to the ambient atmosphere.

3. A sensor as set forth in claim 2 and further including a shaft connecting the rotary position sensor to the cable drum, means for also sealing off the cable chamber with respect to a sensor chamber at said shaft, and a by-pass means for communicating the cable chamber with the sensor chamber.

4. A sensor as set forth in claim 3 including a filter operatively associated with the by-pass means.

5. A sensor as set forth in claim 3 including a cover means for closing off the sensor chamber relative to the ambient atmosphere and arranged entirely outside the differential pressure chamber, wherein the cover means is removable.

6. A sensor as set forth in claim 5 wherein the cover means is a cap.

7. A sensor as set forth in claim 3 including a shut-off valve operable to close the by-pass means.

8. A sensor as set forth in claim 1 wherein the cable drum is disposed in the cable chamber and the rotary position sensor for the cable drum is arranged outside the cable chamber and there is an absence of mechanical connection between the rotary position sensor and the cable chamber.

9. A sensor as set forth in claim 8 including magnetic means operatively connecting the rotary position sensor to the cable drum.

10. A sensor as set forth in claim 8 including inductive means operatively connecting the rotary position sensor to the cable drum.

11. A sensor as set forth in claim 8 including a magnetic coupling means operatively connecting the rotary position sensor to the cable drum.

12. A sensor as set forth in claim 11 and further including a shaft connecting the rotary position sensor for the cable drum to the cable drum, a housing enclosing the cable chamber and the spring chamber and having an outside wall, wherein the magnetic coupling means includes a first coupling portion disposed in operative association with the cable chamber and the spring chamber and non-rotatably connected to the cable drum by way of said shaft, wherein said first coupling portion is disposed in the proximity of said outside wall of said housing enclosing the cable chamber and the spring chamber, and wherein the magnetic coupling means has a second coupling portion arranged outside of and in the proximity of said outside wall of said housing and operatively connected to said rotary position sensor.

13. A sensor as set forth in claim 12 and further including an additional cap wherein said second coupling portion is disposed within said additional cap.

14. A sensor as set forth in claim 13 wherein said rotary position sensor is disposed within said additional cap.

15. A sensor as set forth in claim 13 including means for sealing said additional cap dust-tightly but non-pressure-tightly relative to ambient atmosphere.

16. A sensor as set forth in claim 1 and including a housing enclosing said cable chamber and said spring chamber, and a cable bushing through which said measuring cable movably passes, wherein the connecting means on the cable comprises a cable eye disposed in a cable eye chamber which at the same time is the differential pressure chamber and which is sealed off with respect to the cable bushing on the one hand and with respect to said housing on the other hand.

17. A sensor as set forth in claim 1 and further including a housing enclosing said cable chamber, and said spring chamber and comprising at least one tubular portion and further portions closing same in endwise relationship, and further including means for sealing said portions with respect to one another, said portions constituting said housing.

18. A sensor as set forth in claim 17 wherein said sealing means comprise O-rings.

19. A sensor as set forth in claim 17 and further including cable ducting means for cable to pass through said housing, said cable ducting means being adapted to be pressure-tight.

20. A sensor as set forth in claim 17 wherein said housing includes a closable venting opening in relation to normal pressure ambient atmosphere.

21. A sensor as set forth in claim 20 wherein said venting opening is a venting screw.

22. A sensor as set forth in claim 1 and further including a shaft connecting the rotary position sensor and the cable drum, a tubular housing portion, and means for mounting and axially sealing said shaft in said tubular housing portion.

23. A sensor as set forth in claim 22 including a rolling bearing means for mounting said shaft, and a shaft sealing ring means for sealing said shaft.

24. A sensor as set forth in claim 22 including a plain bearing means for mounting said shaft, and at least one axially spaced O-ring for sealing said shaft.

* * * * *